(12) United States Patent
Saraya et al.

(10) Patent No.: US 11,405,449 B1
(45) Date of Patent: Aug. 2, 2022

(54) OPTIMIZING RESPONSE TIME BY LOAD SHARING IN EDGE COMPUTING

(71) Applicant: INTERNATIONAL BUSINESS MACHINES CORPORATION, Armonk, NY (US)

(72) Inventors: Siddharth K. Saraya, Raniganj (IN); Mukundan Sundararajan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/491,970

(22) Filed: Oct. 1, 2021

(51) Int. Cl.
| | |
|---|---|
| *H04L 67/10* | (2022.01) |
| *G06F 8/61* | (2018.01) |
| *H04L 9/40* | (2022.01) |
| *G06F 9/48* | (2006.01) |
| *G06F 9/50* | (2006.01) |

(52) U.S. Cl.
CPC ............... *H04L 67/10* (2013.01); *G06F 8/61* (2013.01); *G06F 9/4868* (2013.01); *G06F 9/5044* (2013.01); *H04L 63/10* (2013.01)

(58) Field of Classification Search
CPC . H04L 67/10; H04L 63/10; G06F 8/61; G06F 9/4868; G06F 9/5044
See application file for complete search history.

(56) References Cited

U.S. PATENT DOCUMENTS

| 10,432,752 B2 | 10/2019 | Lee et al. |
| 2018/0302495 A1 | 10/2018 | Lee et al. |
| 2020/0153752 A1* | 5/2020 | Chan ............... G06F 16/958 |
| 2021/0004265 A1* | 1/2021 | Guim Bernat ......... H02J 3/381 |
| 2021/0007023 A1* | 1/2021 | Umapathy ........ H04W 36/0061 |

(Continued)

FOREIGN PATENT DOCUMENTS

| WO | 2013131337 A1 | 9/2013 |
| WO | 2018095537 A1 | 5/2018 |

OTHER PUBLICATIONS

Ren, J., et al., "Collaborative Cloud and Edge Computing for Latency Minimization", IEEE Transactions on Vehicular Technology, Mar. 2019, 15 pgs.

(Continued)

*Primary Examiner* — El Hadji M Sall
(74) *Attorney, Agent, or Firm* — Maeve Carpenter; George S. Blasiak; Heslin Rothenberg Farley & Mesiti PC (57) ABSTRACT

Methods, computer program products, and systems are presented. The methods include, for instance: analyzing resources of an edge device available for computing workloads of a cloud to which the edge device is operatively coupled various communication networks per locations of the edge device, wherein the edge device is mobile. A location of the edge device at an estimated time of delivery of an output of a cloud application is predicted prior to the estimated time of delivery. It is determined that the location of the edge device from the predicting is serviced by a communication network below a threshold connectivity. The cloud has the cloud application installed on the edge device at a current location according to an access permission on the edge device. The edge device continues processing the workloads of the cloud and the output of the cloud application generated.

20 Claims, 6 Drawing Sheets

(56) References Cited

U.S. PATENT DOCUMENTS

2021/0144517 A1* 5/2021 Guim Bernat ........ G06F 9/4881
2021/0256632 A1* 8/2021 Chiocco ............... A01D 41/127

OTHER PUBLICATIONS

Mu, S., "Computation offloading to edge cloud and dynamically resource-sharing collaborators in Internet of Things", EURASIP Journal on Wireless Communications and Networking, Dec. 2020, 22 pgs.

Dassa, G., et al., "Method and System for Delegating Task Computations Between Local Devices, Multi-Access Edge Computing, and a Cloud Computing Environment", IPCOM000259052D, Jul. 8, 2019, 5 pgs.

Anonymous, "Distributed Placement of Machine-Learning Computing in an Edge Network", IPCOM000254862D, Aug. 9, 2018, 10 pgs.

Anonymous, "Customized dynamic application delivery based on user need", IPCOM000256266D, Nov. 15, 2018, 8 pgs.

Maggiani, R., "Method for Installing Only Those Application Features That Are Actually Used", IPCOM000179205D, Feb. 9, 2009, 5 pgs.

Mell, Peter, et al., "The NIST Definition of Cloud Computing", NIST Special Publication 800-145, Sep. 2011, Gaithersburg, MD, 7 pgs.

\* cited by examiner

OPTIMIZING RESPONSE TIME BY LOAD SHARING IN EDGE COMPUTING

TECHNICAL FIELD

The present disclosure relates to database transformation, and more particularly to methods, computer program products, and systems for optimizing a response time by offsetting a data transfer delay with cloud load sharing on edge devices according to edge device capacity.

BACKGROUND

With advances in processing powers of mobile devices and cloud computing, cloud computing and edge computing are widely adopted and rapidly evolving. Conventionally, cloud computing and edge computing employ a certain workload distribution model in which clouds process big data across the clouds and edge devices process real-time/instant data generated in the respective edge devices. Often cloud applications and the edge device agent program for the cloud applications interact with each other to produce a user response based on respectively processed intermediate results for users accessing the clouds via their edge devices in edge computing. With a conventional workload distribution model as described above, however, a two-way communication channel with a certain threshold communication capacity between the edge devices and the clouds is consistently needed until delivering the user response to the users due to the conventional workload distribution and a response delivery mechanism.

SUMMARY

The shortcomings of the prior art are overcome, and additional advantages are provided, through the provision, in one aspect, of a method. The method includes, for instance: analyzing, by one or more processor, resources of an edge device available for computing workloads of a cloud to which the edge device is operatively coupled various communication networks per locations of the edge device, where the edge device is mobile; predicting, by the one or more processor, a location of the edge device at an estimated time of delivery of an output of a cloud application prior to the estimated time of delivery; determining, by the one or more processor, that the location of the edge device from the predicting is serviced by a communication network below a threshold connectivity; installing, by the one or more processor, the cloud application on the edge device at a current location according to an access permission on the edge device; and facilitating, by the one or more processor, the edge device to generate the output of the cloud application by sending data for the cloud application and a status indicator identifying unprocessed logical functions of the cloud application.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
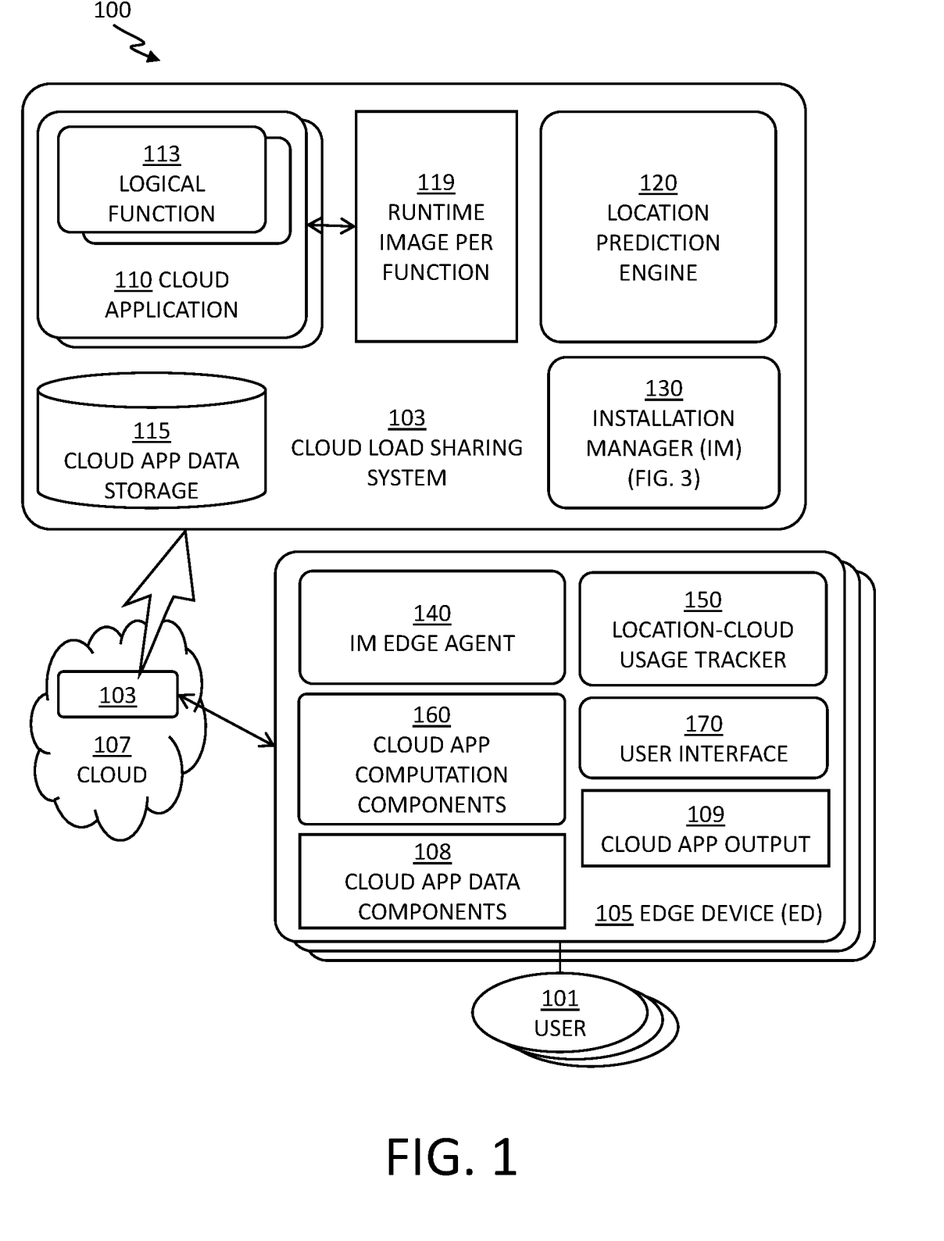
FIG. 1 a system for optimizing a response time of a cloud application based on workload sharing, in accordance with one or more embodiments set forth herein.

FIG. 1 a system 100 for optimizing a response time of a cloud application response based on workload sharing, in accordance with one or more embodiments set forth herein.

With advances in processing powers of smart mobile devices and cloud computing, cloud computing and edge computing are widely adopted and rapidly evolving. Conventionally, cloud computing and edge computing employ a certain workload distribution model in which clouds process big data across the clouds and edge devices process real-time/instant data generated in the respective edge devices. Often cloud applications and the edge device agent program for the cloud applications interact with each other to produce a user response based on respectively processed intermediate results for users accessing the clouds via their edge devices in edge computing. With a conventional workload distribution model as described above, however, a two-way communication channel with a certain threshold communication capacity between the edge devices and the clouds is consistently needed until delivering the user response to the users due to the conventional workload distribution and a response delivery mechanism. Because various digital communication networks in differing capacities would be involved in the two-way communication channel between the clouds and the edge devices in edge computing, because a single cloud can be implemented across multiple data centers, and also because the edge devices are mobile and carried around in many communication zones/areas with distinctive communication capacities even while processing for the final response for the users, relying on the conventional workload distribution model in edge computing may suffer reduced performance due to unnecessary delays for a lack of data availability for the part of the workload processing on both the clouds and the edge devices, and due to a lack of proper communication capacity between the edge devices and the clouds while transferring intermediate results to and from the clouds and the edge devices in order to produce the final response for the users.

In edge computing, while the edge devices often have more processing power and larger memory and storage than before enough to handle a certain workload conventionally handled by the clouds, the edge devices are often idling while waiting for the clouds to send in processed results in the conventional workload distribution model as described above. A data transfer delay of an intermediate result from the clouds to the edge devices followed by the idling resources on the edge devices while waiting for the clouds to process the intermediate result would further delay a delivery of a final response to the users. Accordingly, under certain circumstances, both improving resource utilization on the edge devices and minimizing any data transfer delay on the delivery of the final response to the users can be achieved by shifting data transfer time for a better communication capacity in cases where a traditionally cloud workload can be processed on the edge devices. Embodiments of the present invention presents the system 100 in which traditional cloud workload would be transferred to the edge devices mid-processing to minimize an adverse impact on a data transfer delay from the cloud to the edge devices at the time of delivering the final response for the users.

The system 100 includes a cloud 107 and a plurality of edge devices. The cloud 107 runs a cloud load sharing system 103, in concert with supporting processes on the edge devices. The cloud 107 is an instance of a cloud computing environment 50. Details on conventional cloud functionalities of the cloud computing environment 50 are presented in FIGS. 6-7 and corresponding description. The cloud load sharing system 103 communicates with the plurality of edge devices including an edge device (ED) 105 in order to optimize a response time until the user 101 receives a result from the ED 105 by shifting workload of the cloud application 110 mid-processing to the ED 105 to offset a data transfer delay from the cloud 107 to the ED 105 in cases where the communication capacity at a location of the data transfer would be lower than a preconfigured threshold. Examples of the ED 105 include, but are not limited to, smart phones, laptops, tablets, smart watches, wearable/handheld video camera, etc.

The cloud load sharing system 103 includes a plurality of cloud applications including a cloud application 110. The cloud application 110 includes a plurality of logical functions including a logical function 113. The cloud application 110 corresponds to a runtime image per function 119 while processing cloud app data stored in a cloud app data storage 115 of the cloud load sharing system 103. The cloud load sharing system 103 also includes a location prediction engine 120 and an installation manager (IM) 130.

The location prediction engine 120 communicates primarily with the IM 130 in determining whether or not a communication capacity at a predicted delivery location would be below a threshold that triggers cloud load sharing on the ED 105. The location prediction engine 120 predicts at which location the ED 105 would receive a data transfer of an output by the cloud application 110 from the cloud 107 based on data received from the ED 105.

In certain embodiments of the present invention, the location prediction engine 120 builds a location prediction model by machine learning and trains the location prediction model with the data received from the ED 105 on a location history of the ED 105 and a cloud usage log of the ED 105. At the estimated time of delivery of an output of the cloud application 110, the location prediction engine 120 predicts where the ED 105 would be located to assess communication capacity of the predicted location. If the communication capacity of the predicted delivery location for the delivery of the output of the cloud application 110 to the ED 105 is below a threshold for a certain range of acceptable response time, the location prediction engine 120 would inform the IM 130 for sharing the cloud load with the ED 105. After completing a round of cloud load sharing based on the predicted location, the location prediction engine 120 updates the location prediction model based on an actual location of the ED 105 at the time of delivery, a cloud usage record between the request and the response, and other performance indicators regarding the response time in order to provide a better prediction on the delivery location and future recommendations on the cloud load sharing with the ED 105.

In this specification, a term "delivery" refers to the data transfer of the output by the cloud application 110 from the cloud 107 without cloud load sharing with the ED 105, and a term "delivery time" refers to a point of time at which such data transfer occurs. Also in this specification, a term "response" refers to a result the user 101 receives from the ED 105 including the output of the cloud application 110 in combination with optional ED outputs, if any, and a term "response time" refers to a period of time from a request by the user 101 until the user 101 receives the response on the ED 105.

The IM 130 installs certain unprocessed logical functions of the cloud application 110 to the ED 105 based on assessment of processing and storage capacity of the ED 105 under certain conditions preconfigured for the cloud load sharing with the ED 105. The unprocessed logical functions including a logical function 113 of the cloud application 110 are required to generate the output of the cloud application 110.

Currently, the cloud 107 and the ED 105 are coupled via a communication network with a data transfer rate high enough for the communication channel between the cloud 107 and the ED 105. However, due to a movement by the ED 106, the cloud 107 and the ED 105 may not have a proper communication channel at a time of delivery when the cloud application 110 should deliver the output of the cloud application 110 to the ED 105 when the processing has been completed and the output of the cloud application 110 is ready for the user 101. As noted for the location prediction engine 120, the IM 130 would receive any potential issue with the communication channel based on the predicted location of the ED 105 at the time of the delivery of the output of the cloud application 110 from the location prediction engine 120. Upon being informed with any potential communication issues at the estimated time of delivery by the cloud application 110 to the ED 105, the IM 130 would attempt to have the logical function 101 of the cloud application 110 processed by the ED 105. Per the location prediction engine 120, the communication channel between the cloud 107 and the ED 105 at a current location services a high enough data transfer rate for downloading any data and computation components of the cloud application to complete processing at the ED 105.

Under the circumstances that the ED 105 has capacity to process the remaining workloads of the cloud application 110 and the response time for the cloud application 110 would be negatively impacted as the ED 105 would be communicating with much less efficiency at predicted delivery time, the IM 130 determines that the cloud load sharing to be commenced to improve the response time, based on the configurations of the cloud load sharing. In certain embodiments of the present invention, the IM 130 is configured to prompt the user 101 for interactive confirmation on the cloud load sharing prior to beginning an installation of the cloud application 110 on the ED 105. In certain embodiments of the present invention, the IM 130 is configured to automatically start downloading to continue with the cloud application 110 for a particular cloud application that had a certain permission set for the cloud load sharing. In certain embodiments of the present invention, the IM 130 can be turned on or off by the user 101 for each of the cloud applications, in combination with an automated installation option and the interactive installation option noted above. In certain embodiments of the present invention, the IM 130 can pre-install certain number of the cloud applications that can be processed in the ED 105, based on user preference and a size and a frequency of use of the cloud applications, and subsequently downloads only any data and runtime environment of a current process of the cloud application according to the cloud load sharing configuration when the location prediction engine 120 notified a diminished communication capacity at the time of delivery.

Upon determining that the cloud load sharing is authorized based on the configurations of the cloud load sharing and/or confirmation by the user 101, the IM 130 transfers, to the ED 105, unprocessed logical functions of the cloud application 110 as well as the cloud app data stored in the cloud app data storage 115 corresponding to the certain unprocessed logical functions of the cloud application 110 that is being installed in the ED 105. Detailed operations of the IM 130 are presented in FIG. 3 and corresponding description.

The ED 105 is a smart mobile device carried around by a user 101. Each of the plurality of edge devices also corresponds to respective users. The ED 105 communicates with the cloud load sharing system 103 residing in the cloud 107 via various digital communication networks. As noted above, the ED 105 is equipped with a certain reasonable processing power for computing instant data or real-time data input originating from various sensors and detectors of the ED 105 to contribute to the response by the cloud application 110 without sending the instant data to the cloud application 110 and receiving the output of the cloud application 110 from the cloud application 110 running in the cloud 107.

The ED 105 includes an IM edge agent 140, a location-cloud usage tracker 150, and a user interface 170. Via the user interface 170 on the ED 105, the IM 130 can communicate directly with the user 101 without engaging the IM edge agent 140 when an installation of the cloud application 110 on the ED 105 has been reported by the location prediction engine 120.

The location-cloud usage tracker 150 primarily interacts with the location prediction engine 120 of the cloud 107, providing training data including location data and cloud usage logs of the ED 105 for the cloud load sharing system 103 to train the location prediction model at the estimated time of delivery of the output of the cloud application 110 by machine learning and to verify the predicted locations of the ED 105 at the delivery time.

The IM edge agent 140 interacts primarily with the IM 130 in the cloud load sharing system 103 in installing cloud app computation components 160 on the ED 105 once the cloud load sharing was determined to be optimizing the response time for the user 101. In certain embodiments of the present invention, each of the plurality of the logical functions including the logical function 113 of the cloud application is defined with input parameters and output parameters as a unit of execution for the cloud application 110, regardless of where the cloud application 110 runs. The cloud app computation components 160 would include a number of unprocessed logical functions to be performed in the ED 105.

The IM edge agent 140 also downloads cloud app data components 108 that correspond to the cloud app computation component 160 that is being installed. A combination of the cloud app computation component 160 and the cloud app data components 108 would be sufficient to complete the unprocessed logical functions including the logical function 113 of the cloud application 110.

In certain embodiments of the present invention, the IM 130 sends and the IM edge agent 140 receives the runtime image per function 119 of the cloud application 110 in the cloud load sharing system 103 with respective status indicators marking which logical functions has been processed in the cloud 107 and which logical functions are remaining to be processed in the ED 105.

The ED 105 completes processing of the logical function 113 unprocessed from the cloud 107 by running the combination of the cloud app computation component 160 and the cloud app data components 108 that had been installed and downloaded onto the ED 105 according to the status indicators of the runtime image per function 119 for the cloud application 119. The ED 105 generates a cloud app output 109 in the ED 105 upon completion of processing the combination of the cloud app computation component 160 and the cloud app data components 108 as previously prepared for processing in the ED 105. As noted above, because the cloud load sharing system 103 had installed and downloaded the combination of the cloud app computation component 160 and the cloud app data components 108 onto the ED 105 to offset any predicted communication delay at the delivery time, the ED 105 can complete processing the cloud application 110 independently from the cloud 107. The ED 105 subsequently produces a full response including the cloud app output 109 and optional ED output originally configured for processing in the ED 105 alone without engaging the cloud 107, if any, to the user 101 via the user interface 170.

In certain embodiments of the present invention, the IM edge agent 140 can be configured to automatically uninstall the cloud app computation component 160 and deletes the cloud app data components 108 if an instance of the cloud load sharing is unlikely to be repeated based on a cloud usage pattern of the ED 105. The IM edge agent 140 clears any a data dump from the runtime image per function 119, the status indicator, and the cloud app data components 108 that are uniquely related to this instance of the cloud load sharing even in cases where the IM edge agent 140 keeps the cloud app computation component 160, that is the ED version of the cloud application program, as being a frequent candidate for the cloud load sharing based on the cloud usage pattern of the ED 105.

In certain embodiments of the present invention, the cloud load sharing system 103 builds a proprietary set of logical functions for the cloud application 110. Each of the logical functions for the cloud application 110 is defined with respective input and output parameter set such that each of the logical functions can be processed as a unit even if a running platform is switched in the middle of processing the cloud application 110. As noted, each of the logical functions for the cloud application 110 is tagged with a status indicator representing whether or not a particular logical function has been processed in the cloud 107 for a uniquely identifiable process flow responding to a user request such that any unprocessed logical functions of the cloud application 110 can be processed seamlessly at the ED 105.

In certain embodiments of the present invention, the cloud load sharing system 103 analyzes processing capacity, available memories and storages, and any other resources of the ED 105 in order to determine whether or not the ED 105 can process certain unprocessed logical functions of the cloud application for any instances. According to the available system resources of the ED 105, the cloud load sharing system 103 can convert the cloud application 110 into an ED version with lower system requirements than the cloud 107 in building an installation package for the ED 105. The utilization rate of the ED 105 in processing data originating from the ED 105 by sensors, cameras, and other interfaces, would be taken into account in assessing how much resources of the ED 105 can be utilized to process the cloud application 110.

In certain embodiments of the present invention, the cloud load sharing system 103 monitors locations of the ED 105 and cloud usages by the ED 105, based on the data sent from the location-cloud usage tracker 150 in the ED 105. As noted, the location prediction engine 120 of the cloud load sharing system 103 trains the location prediction model by machine learning (ML) with the location history data and the cloud usage logs of the plurality of the edge devices including the ED 105 and updates the location prediction model by comparing the predicted location at the delivery time and estimated performance gain by the cloud load sharing with the actual location at the delivery time and a resulting response time as measured by production of the cloud app output 109 by the cloud load sharing. The cloud load sharing system 103 can automatically transfer the processing of the cloud application 110 as described herein or prompts the user 101 if the ED 105 should take over processing of the cloud application 110 and proceeds based on an input by the user 101, based on a use permission configured for the cloud application on the ED 105 set by the user 101.

In certain embodiments of the present invention, the cloud load sharing system 103 can process workloads of the ED 105 in cases where the ED 105 originates massive data as in a high-definition and/or high-fidelity multimedia streaming, in cases where the communication capacity between the cloud 107 and the ED 105 supports such data transfer. The user 101 can choose to directly store the multimedia stream into the cloud 107 and to be processed in the cloud 107 later rather than download the multimedia stream and processes on the ED 105 or any other personal device of the user 101. Conventional edge computing models often distributes workload based on the size of the data, among other things, and the workload originating from the ED 105 is often delegated to the cloud 107 for processing. The cloud load sharing as described herein is an inversion of conventional workload sharing in the edge computing that fits a specific circumstance regarding the communication capacity change and user preference on the response time.

Figure 2:
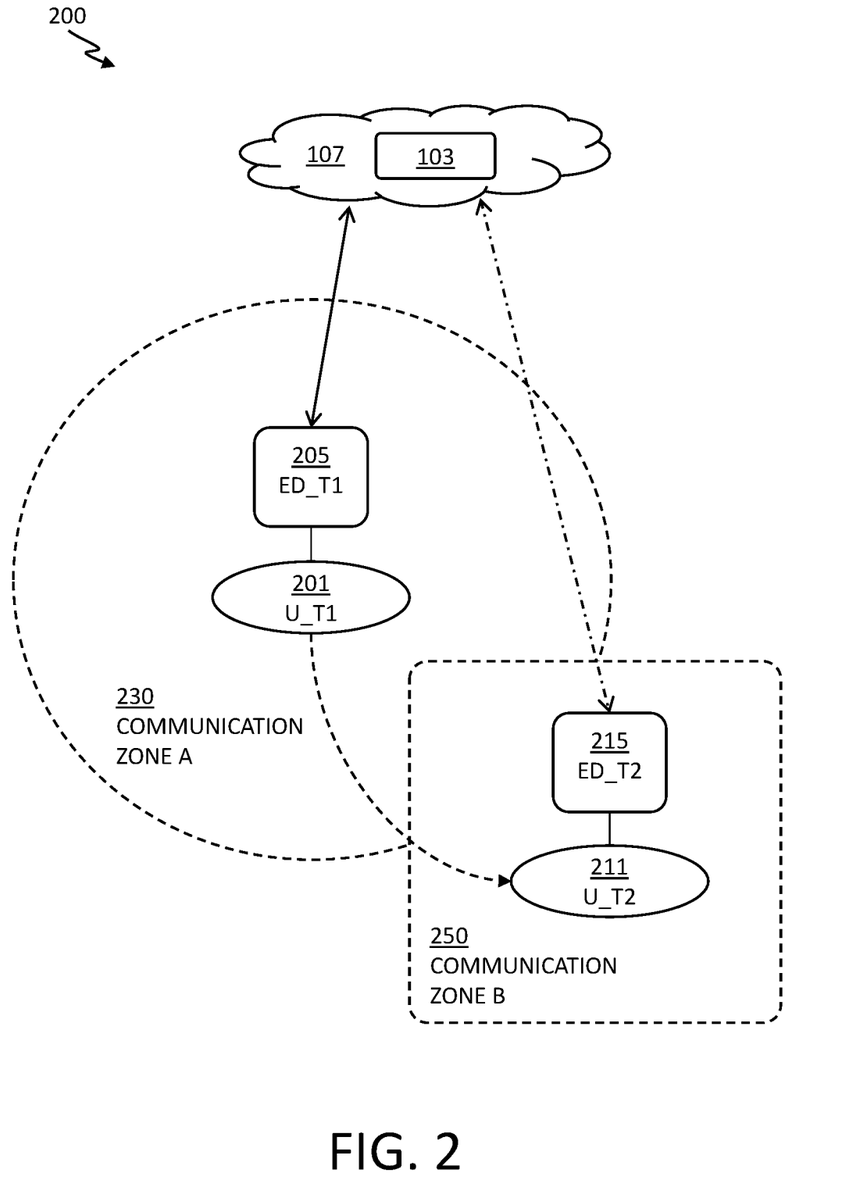
FIG. 2 depicts an exemplary circumstance in which the system of FIG. 1 would improve the response time of the cloud application substantially over a conventional workload distribution between the cloud and the ED, in accordance with one or more embodiments set forth herein

FIG. 2 depicts a use case scenario in which the system 100 of FIG. 1 would improve the response time of the cloud application 110 over a conventional workload distribution between the cloud 103 and the ED 105, in accordance with one or more embodiments set forth herein.

The respective amounts of resources of the ED 105 including the processing capacity, a memory, and storage available are monitored real-time on the ED 105 and communicated to the IM 130 of the cloud load sharing system 103. The embodiments of the present invention presented herein would improve the response time indicating how long the user 101 should wait until the user 101 receives a result corresponding to a request from the cloud application 110 on the ED 105. The result includes the output of the cloud application 110 in combination with optional ED outputs that are originally configured to be processed on the ED 105, as often in real-time/instant data originating from the ED 105 in edge computing.

At a current time, denoted as T1, the user 101 is at a location U_T1 201 carrying the edge device 105 along with the user 101. The edge device 105 is at a location ED_T1 205 at the current time T1. The location ED_T1 205 is within a communication zone A 230 servicing data communication with a certain capacity, as specified by data speed and service type.

The cloud application 110 would transfer the output of the cloud application 110 to the user 101 at a delivery time, denoted as T2. The delivery time T2 is estimated/predicted based on workloads of the cloud 103 and an amount of computation to perform in generating the output of the cloud application 110, in cases where cloud data necessary for generating the output of the cloud application 110 are ready and immediately available from the cloud data storage 115. At the delivery time T2, the user 101 is predicted to be at a location U_T2 211 carrying the edge device 105 along with the user 101, at a location ED_T2 215, presumably the same location as the user location U_T2 211. The location ED_T2 215 is within a communication zone B 250 servicing data communication with a certain capacity, as specified by data speed and service type. The location of the ED 105 at the delivery time ED_T2 215 is predicted by the location prediction model trained with location history of the ED 105 and the user 101.

The output delivery location prediction engine 120 predicts the location U_T2 211 based on a moving pattern of the user at the current time T1, a locations history for the user 101 at the delivery time T2 for routine activities, or a scheduled event on the delivery time T2 in a calendar of the user 101. The locations of the edge device 105 (ED_T1 205, ED_T2 215) are, by default, configured to be the same as the locations of the user 101 (U_T1 201, U_T2 211) both at the current time T1 and the delivery time T2.

For example, in a certain embodiment of the present invention, the communication zone A 230 is a high-speed private Wi-Fi area that services the edge device 105 at the location ED_T1 205 for at a data speed 5 GHz with a limited number of other devices and bandwidth is sufficient for the edge device 105. On the other hand, the communication zone B 250 servicing the edge device 105 at the delivery time T2 can be a geographic area with no signal or weak signal or only a low-speed Wi-Fi is available to be shared with many other people in the communication zone B 230, resulting in a very low bandwidth available for the edge device 105 in receiving an output by the cloud app 110 from the cloud 103.

In certain embodiments of the present invention, the location prediction engine 120 utilizes previous location history for training the location prediction model by machine learning. The location prediction model is adaptively trained with any new location of the edge device 105.

Figure 3:
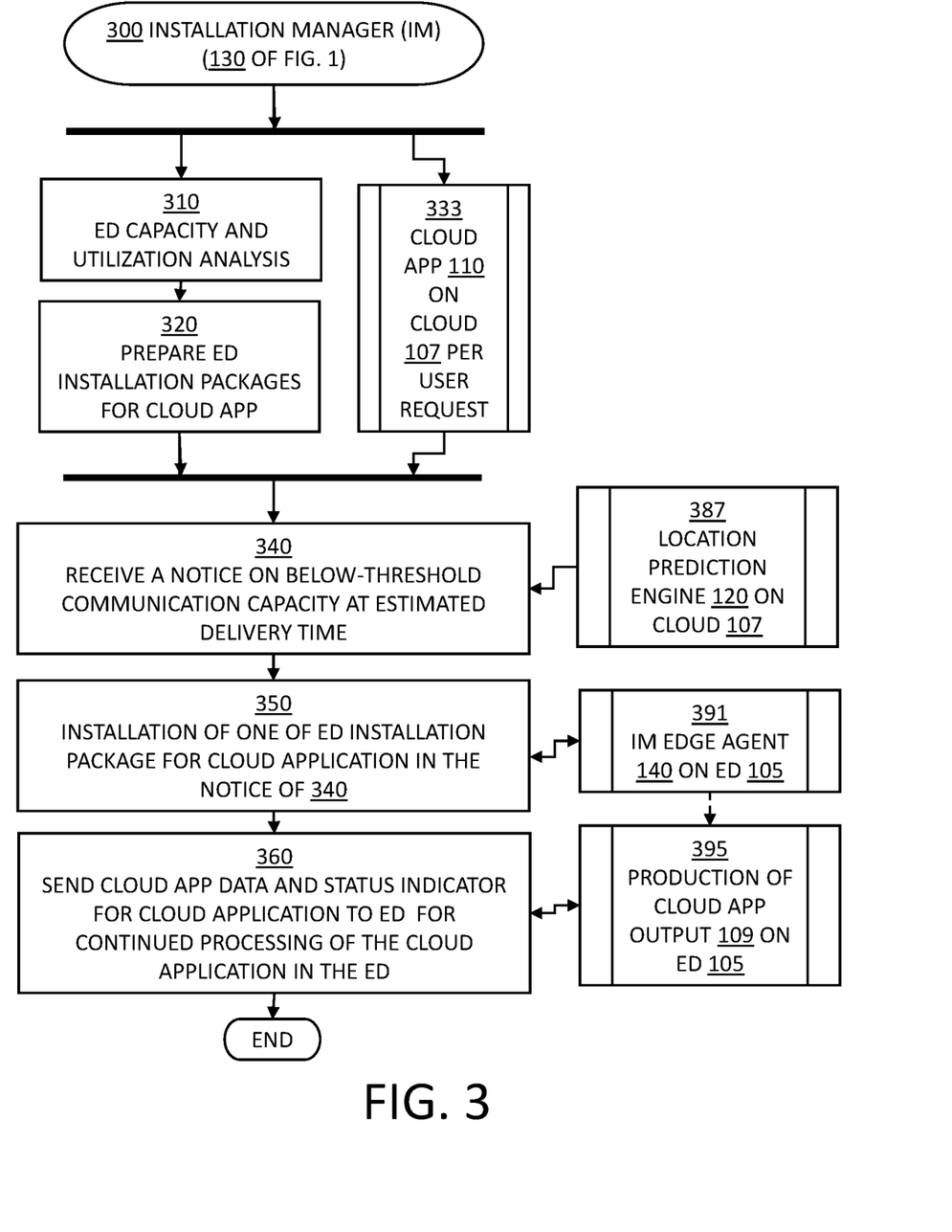
FIG. 3 depicts a flowchart of operations performed by the IM of the cloud load sharing system of FIG. 1, in accordance with one or more embodiments set forth herein.

FIG. 3 depicts a flowchart of operations performed by the IM 130 of the cloud load sharing system 103 of FIG. 1, in accordance with one or more embodiments set forth herein.

In certain embodiments of the present invention, operations by the IM 130 presented herein can be performed by many processes in the cloud load sharing system 103. Each block in FIG. 3 can be represented in multiple subprocesses. Blocks 333, 387, 391, and 395 are not part of the IM 130 but presented in FIG. 3 to show interrelation of the blocks with the operations of the IM 130. Blocks 333, 387, 391, and 395 are represented as respective predefined processes, indicating the named element of the system 100 in FIG. 3 and corresponding description.

In block 310, the IM 130 assesses computational capacities of resources in the ED 105 and analyzes utilization of the resources of the ED 105 to see how much resources would be available for the cloud load sharing. With lower utilization of the ED 105 on average, the IM 130 determines more resources of the ED 105 would be available for processing workloads from the cloud 107, so the ED 105 would be a better candidate than another ED of the same capacity with higher utilization. The IM 130 would terminate if a level of available resources does not meet a preconfigured threshold for sharing the workload of the cloud application 110. Based on terms on collection of system information on the ED 105, memory (RAM) size, available storage, operating system name and version, processor type, architecture, and clock speed, average workloads and utilization of respective resources on the ED 105, etc., are identified and shared by the ED 105 with the IM 130. Then, the IM 130 proceeds with block 320.

In block 320, the IM 130 prepares an ED installation package for the cloud application 110. In certain embodiments of the present invention, the IM 130 prepares numerous capacity-differentiated installation packages such that edge devices of varying capacities can participate with the cloud load sharing by working with the cloud load sharing system 103 if a certain threshold processing capacity on the edge device is recognized as available for the cloud load sharing. In certain embodiments of the present invention, the IM 130 converts the cloud application 110 to fit the available resources in the ED 105 as analyzed in block 310. In other embodiments of the present invention, the IM 130 prepares the ED installation package for the cloud application 110 when the system requirements for the cloud application 110 have been met by the available capacity of the ED 105 from the block 310. Then, the IM 103 proceeds with block 340.

While the IM 130 performs blocks 310 and 320, the cloud application 110 can run on the cloud 107 if the user 101 of the ED 105 sends a request to the cloud application 110, as shown in block 333. The cloud application 110 in block 333 can run concurrently with blocks 310 and 320, as the cloud 107 can handle multiple workflows simultaneously by parallel processing of independent tasks.

While the cloud 107 processes the cloud application 110 to generate an output of the cloud application 110, the cloud 107 can estimate when the processing for the cloud application 110 would be completed and the output of the cloud application 110 is to be ready for the user 101 to be delivered to the ED 105. Block 387 represents that the location prediction engine 120 makes a prediction on the ED location and sends in a notice to the IM 130 regarding a connectivity between the cloud 107 and the ED 105. If the location prediction engine 120 predicts a location of the ED 105 at the estimated delivery time of the output of the cloud application 110 and determines that the predicted location of the ED 105 at the estimated delivery time falls within poor connectivity with no to weak signal area or serviced with a low bandwidth regarding the digital communication capacity based on preconfigured connectivity map of a certain area frequently visited by the ED 105, then the location prediction engine 120 sends the notice to the IM 130 to inform the risk of delayed delivery and to recommend a cloud load sharing by the ED 105. As noted earlier, the prediction on the location of the ED 105 at the estimated delivery time is made by the location prediction model as trained by the location history and cloud usage logs provided from the location-cloud usage tracker 150 of the ED 105. In certain embodiments of the present invention, the location-cloud usage tracker 150 of the ED 105 reports a location represented as global positioning system (GPS) coordinates and any cloud application that is being accessed at the location by the ED 105 to the location prediction engine 120, according to configurations of the cloud load sharing system 103 as authorized by the user 101. The location prediction engine 120 has a connectivity map of candidate locations and compares the connectivity of the predicted location to a threshold connectivity for the delivery of the response to determine whether or not to notify the IM 130 for cloud load sharing.

In block 340, the IM 130 receives the notice from the location prediction engine 120 as noted in block 387, that the communication capacity at the estimated delivery time of the output of the cloud application 110 is below a preconfigured threshold in data speed, signal strength, and/or network bandwidth available for the communication between the cloud 107 and the ED 105. According to the preconfigured configuration of the cloud load sharing system 103 and access permission settings on the ED 105, the IM 130 can either automatically install the ED installation package prepared in block 320 to the ED 105 or prompt the user 101 for a permission to install the ED installation package for the cloud application 110. In cases where the ED installation package has already been installed in the ED 105, the TM 130 can notify the user 101 on the cloud computation components previously installed from the ED installation package and prompts the user 101 if the user 101 wishes to cancel or to proceed with the cloud load sharing by the cloud computation components 160.

In block 340, if the cloud application 110 had not been previously installed in the ED 105 and either the automated installation has been configured or the user 101 responds positively upon the prompt for installation, the TM 130 proceeds with block 350 for installation of the ED installation package for the cloud application 110.

In block 340, if the cloud app computation components 160 installed from the ED installation package are already present in the ED 105 and either the user 101 responds positively on the prompt for the cloud load sharing or an automated cloud load sharing is configured, then the IM 130 proceeds with block 360 for processing the unprocessed logical functions of the cloud application 110 with the previously installed cloud app computation components 160.

In block 350, the TM 130 installs the ED installation package for the cloud application 110 on the ED 105 via the IM edge agent 140. In block 391, the IM edge agent 140 installs the ED installation package for the cloud application 110 in the ED 105, which would be the cloud app computation components 160 after the installation. Then, the IM 130 proceeds with block 360.

In certain embodiments of the present invention, the ED installation package is previously prepared executable files of the cloud application 110 for running on a platform of the ED 105. In certain embodiments of the present invention, the ED installation package corresponds to a selection from the runtime image per function 119 of the cloud application 110 such that the ED 105 downloads only the unprocessed logical functions from the runtime image per function 119 of the cloud application 110, which would be stored as the cloud app computation components 160 on the ED 105.

In block 360, the IM 130 sends the cloud app data stored in the cloud app data storage 115 in the cloud 107 and the status indicator marking which logical functions of the cloud application 110 had been already processed in the cloud 107 and which logical functions of the cloud application 110 remain to be processed in the ED 105, within the runtime image per function 119 of the cloud load sharing system 103. In block 395, the ED 105 receives the cloud app data from the cloud and stores as the cloud app data components 108 to continue processing of the cloud application based on the combination of the cloud app computation components 160 and the cloud app data components 108 according to the status indicator to generate the cloud app output 109 on the ED 105. The IM 130 terminates after sending the cloud app data and the status indicator to the ED 105.

In certain embodiments of the present invention, the ED 105 may process only a part of the cloud application 110 when the cloud app output 109 should be produced in the cloud 107 by the cloud application 110. The ED 106, then, returns the processed result of the logical function of the cloud application 110 to the cloud 107 such that the cloud 107 continues processing the rest of the logical functions of the cloud application 110 and produces the cloud app output 109 by the cloud 107.

Certain embodiments of the present invention optimize user response time by processing cloud workload on edge devices where an edge device would be located in an area with a communication capacity below threshold at the time of the response. Certain embodiments of the present invention build a location prediction model based on the location history of the edge device and predict a location of the edge device at the time of delivery based on the location prediction model. Certain embodiments of the present invention assess processing capacity of the edge device and build an edge device installation package of a cloud application that can be performed on the edge device to thereby distribute the cloud workload. Certain embodiments of the present invention build edge device installation packages in logical function units of a cloud application, as a unit of execution in the edge device. Certain embodiments of the present invention download the edge device installation package and install in the edge device as the cloud app computation component as configured for the cloud load sharing system per the capacity of the edge device and/or user input as well as cloud app data components. Certain embodiments of the present invention facilitate a production of the cloud app output in the edge device as the edge device completes a remainder of the process in the cloud application from the cloud. Certain embodiments of the present invention facilitate a partial execution of the cloud application in logical function units in the edge device and resuming by the cloud on processing subsequent logical applications as the edge device notifies a status/progression indicator for the cloud application back to the cloud, based on changes with communication capacity in the edge device location. Certain embodiments of the present invention for the cloud load sharing system may be implemented by use of a cloud platform/data center/server farm in various types including a Software-as-a-Service (SaaS), Platform-as-a-Service (PaaS), Database-as-a-Service (DBaaS), and combinations thereof. The cloud load sharing system can be offered for and delivered to any service providers/business entities/vendors of software applications from any location in the world in need of optimizing response time by sharing cloud workload with edge devices.

Embodiments of the present invention present a computer implemented method including, for instance: analyzing, by one or more processor, resources of an edge device available for computing workloads of a cloud to which the edge device is operatively coupled various communication networks per locations of the edge device, where the edge device is mobile; predicting, by the one or more processor, a location of the edge device at an estimated time of delivery of an output of a cloud application prior to the estimated time of delivery; determining, by the one or more processor, that the location of the edge device from the predicting is serviced by a communication network below a threshold connectivity; installing, by the one or more processor, the cloud application on the edge device at a current location according to an access permission on the edge device; and facilitating, by the one or more processor, the edge device to generate the output of the cloud application by sending data for the cloud application and a status indicator identifying unprocessed logical functions of the cloud application.

Embodiments of the present invention present a computer implemented method also including, for instance: building a location prediction model by machine learning based on location history data of the edge device as training data; predicting the location of the edge device at the estimated time of delivery of the output by the cloud application by use of the location prediction model; and adjusting the predicted location based on any event location scheduled for the user at the estimated time of delivery, based on a calendar of the user.

Embodiments of the present invention present a computer implemented method also including, for instance: building a location prediction model by machine learning based on location history data of the edge device as training data; predicting the location of the edge device at the estimated time of delivery of the output by the cloud application by use of the location prediction model in combination with any event location in a calendar of the user; verifying the predicted location based on an actual location of the edge device at the estimated time of delivery; and updating the location prediction model with the actual location of the edge device for retraining.

Embodiments of the present invention present a computer implemented method also including, for instance: subsequent to the analyzing and prior to the installing, determining that the edge device has a capacity to perform the cloud application; preparing an edge device installation package of the cloud application, the edge device installation package comprising units of executable files for the edge device corresponding to each of logical functions of the cloud application; and automatically transferring the edge device installation package of the cloud application upon determining that a connectivity at the location of the edge device from the predicting is below a threshold connectivity, wherein the access permission to the edge device has been previously granted by the user.

Embodiments of the present invention present a computer implemented method also including, for instance: subsequent to the analyzing and prior to the installing, determining that the edge device has a capacity to perform the cloud application; preparing an edge device installation package of the cloud application, the edge device installation package comprising units of executable files for the edge device corresponding to each of logical functions of the cloud application; prompting the user for an input to transfer the edge device installation package of the cloud application to the edge device upon determining that a connectivity at the location of the edge device from the predicting is below a threshold connectivity; and transferring the edge device installation package of the cloud application to the edge device upon obtaining the input granting the access permission to the edge device.

Embodiments of the present invention present a computer implemented method also including, for instance: obtaining, from the edge device, the output of the cloud application from the edge device; and updating a cloud app data storage with the output of the cloud application.

Embodiments of the present invention present a computer implemented method also including, for instance: obtaining, from the edge device, an intermediate result processed by the edge device and the status indicator identifying a remainder of the unprocessed logical functions of the cloud application; producing the output of the cloud application by processing the remainder of the unprocessed logical functions of the cloud application; and updating a cloud app data storage with the output of the cloud application.

Figure 4:
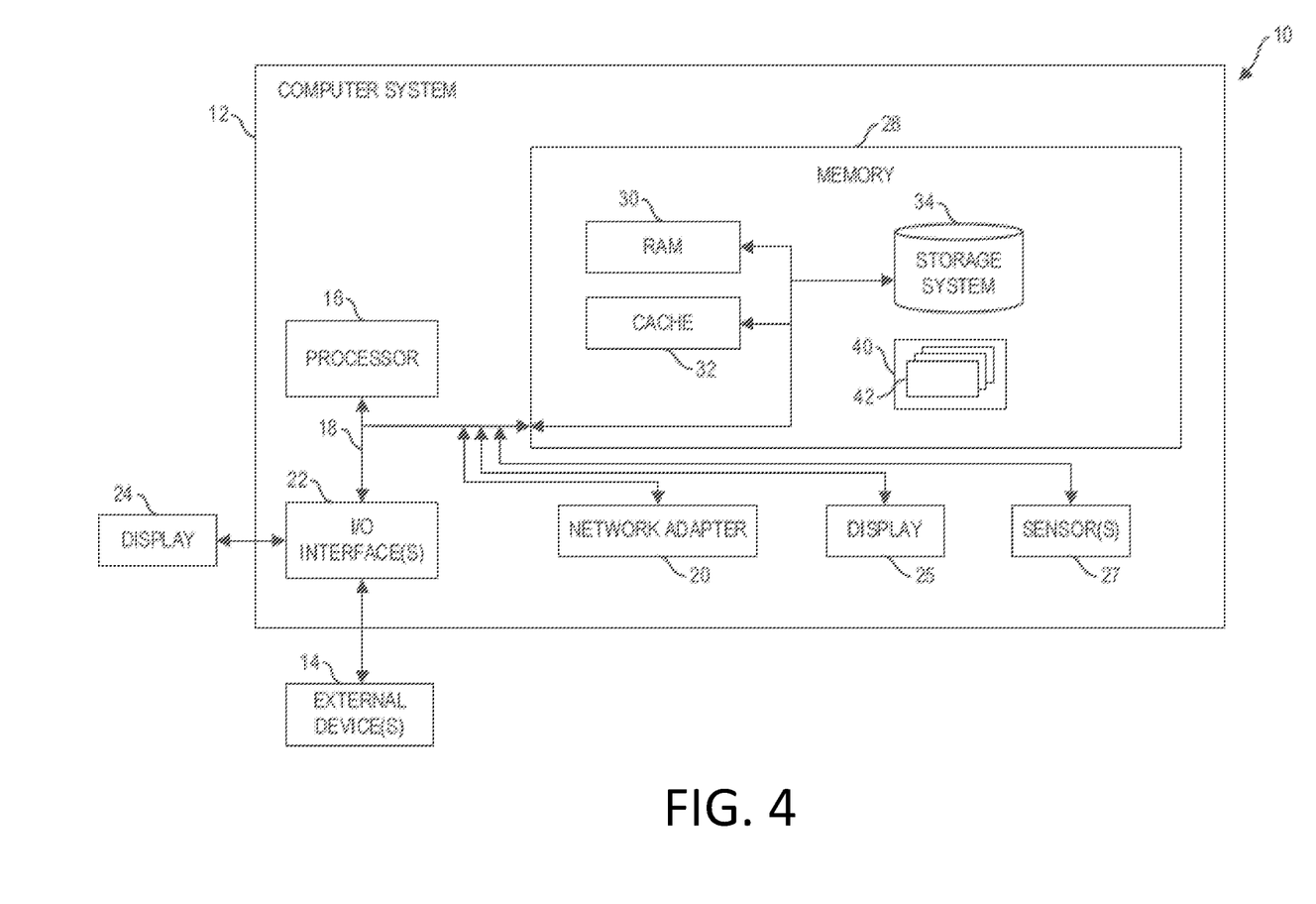
FIG. 4 depicts a cloud computing node according to an embodiment of the present invention.
Figure 5:
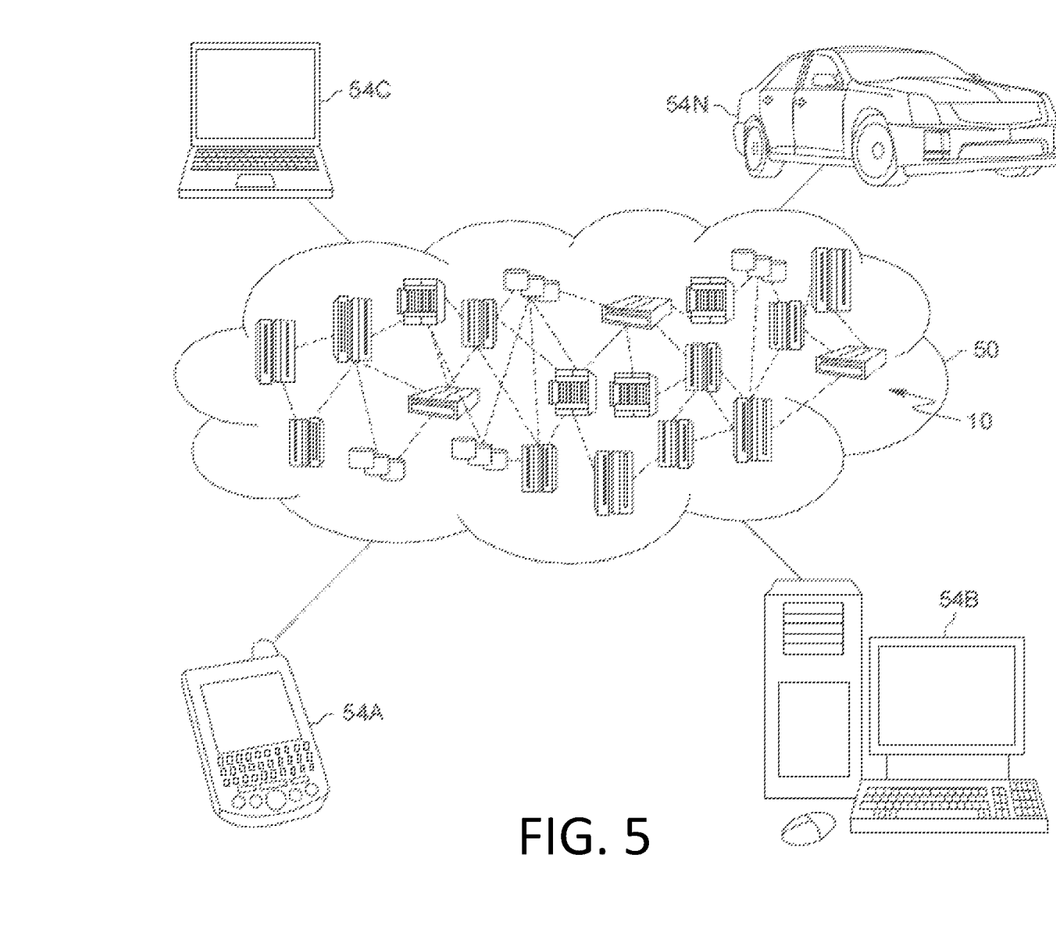
FIG. 5 depicts a cloud computing environment according to an embodiment of the present invention.
Figure 6:
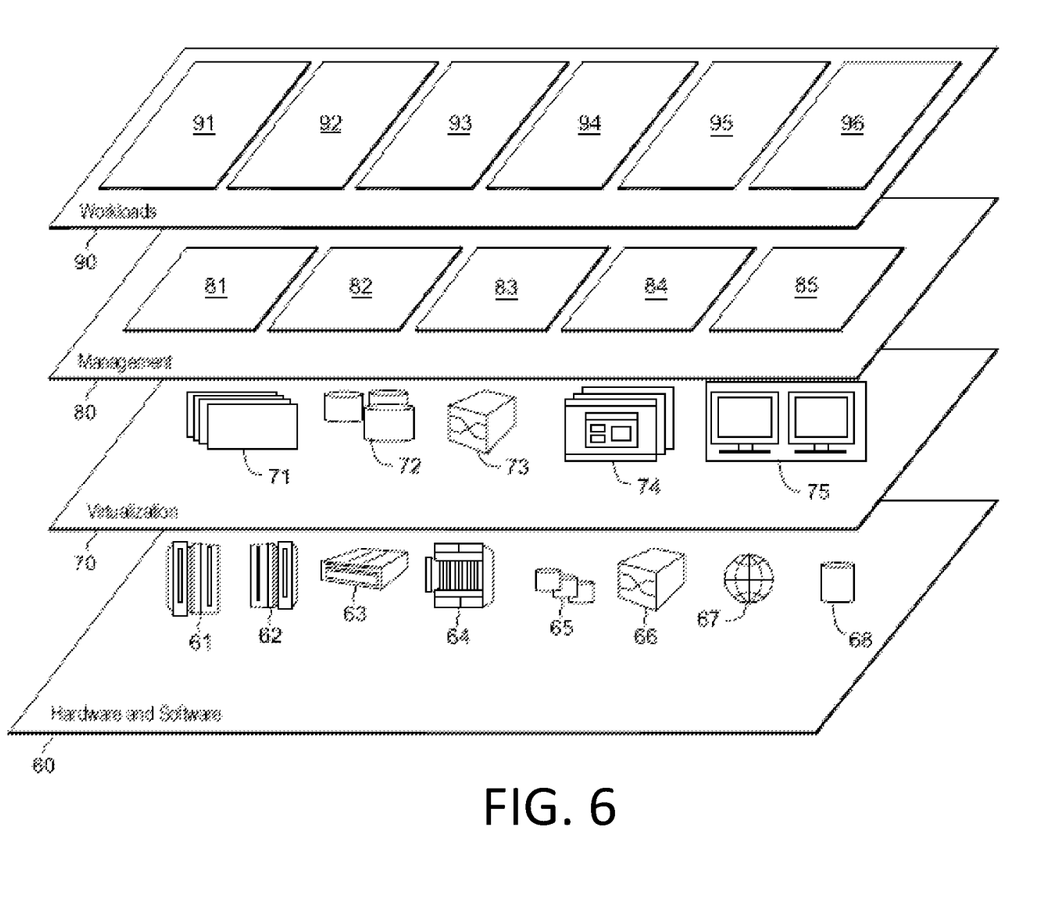
FIG. 6 depicts abstraction model layers according to an embodiment of the present invention.

FIGS. 4-6 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purposes or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the location prediction engine 120, the IM 130, and the IM edge agent 140 of FIG. 1. Program processes 42, as in the location prediction engine 120, the IM 130, and the IM edge agent 140, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, Redundant Array of Independent/Inexpensive Disks (RAID) systems, tape drives, and data archival storage systems, etc.

Referring now to FIG. 5, illustrative cloud computing environment 50 is depicted. As shown, cloud computing environment 50 includes one or more cloud computing nodes 10 running the database decomposition system 120 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for various processes in the cloud load sharing system, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    analyzing, by one or more processor, resources of an edge device available for computing workloads of a cloud to which the edge device is operatively coupled various communication networks per locations of the edge device, wherein the edge device is mobile;
    predicting, by the one or more processor, a location of the edge device at an estimated time of delivery of an output of a cloud application prior to the estimated time of delivery;
    determining, by the one or more processor, that the location of the edge device from the predicting is serviced by a communication network below a threshold connectivity;
    installing, by the one or more processor, the cloud application on the edge device at a current location according to an access permission on the edge device; and
    facilitating, by the one or more processor, the edge device to generate the output of the cloud application by sending data for the cloud application and a status indicator identifying unprocessed logical functions of the cloud application.

2. The computer implemented method of claim 1, the predicting comprising:
    building a location prediction model by machine learning based on location history data of the edge device as training data;
    predicting the location of the edge device at the estimated time of delivery of the output by the cloud application by use of the location prediction model; and
    adjusting the predicted location based on any event location scheduled for a user at the estimated time of delivery, based on a calendar of the user.

3. The computer implemented method of claim 1, the predicting comprising:
    building a location prediction model by machine learning based on location history data of the edge device as training data;
    predicting the location of the edge device at the estimated time of delivery of the output by the cloud application by use of the location prediction model in combination with any event location in a calendar of a user;
    verifying the predicted location based on an actual location of the edge device at the estimated time of delivery; and
    updating the location prediction model with the actual location of the edge device for retraining.

4. The computer implemented method of claim 1, further comprising:
    subsequent to the analyzing and prior to the installing, determining that the edge device has a capacity to perform the cloud application;
    preparing an edge device installation package of the cloud application, the edge device installation package comprising units of executable files for the edge device corresponding to each of logical functions of the cloud application; and
    automatically transferring the edge device installation package of the cloud application upon determining that a connectivity at the location of the edge device from the predicting is below a threshold connectivity, wherein the access permission to the edge device has been previously granted by a user.

5. The computer implemented method of claim 1, further comprising:
   subsequent to the analyzing and prior to the installing, determining that the edge device has a capacity to perform the cloud application;
   preparing an edge device installation package of the cloud application, the edge device installation package comprising units of executable files for the edge device corresponding to each of logical functions of the cloud application;
   prompting a user for an input to transfer the edge device installation package of the cloud application to the edge device upon determining that a connectivity at the location of the edge device from the predicting is below a threshold connectivity; and
   transferring the edge device installation package of the cloud application to the edge device upon obtaining the input granting the access permission to the edge device.

6. The computer implemented method of claim 1, further comprising:
   obtaining, from the edge device, the output of the cloud application from the edge device; and
   updating a cloud app data storage with the output of the cloud application.

7. The computer implemented method of claim 1, further comprising:
   obtaining, from the edge device, an intermediate result processed by the edge device and the status indicator identifying a remainder of the unprocessed logical functions of the cloud application;
   producing the output of the cloud application by processing the remainder of the unprocessed logical functions of the cloud application; and
   updating a cloud app data storage with the output of the cloud application.

8. A computer program product comprising:
   a computer readable storage medium readable by one or more processors and storing instructions for execution by the one or more processors for performing a method comprising:
      analyzing resources of an edge device available for computing workloads of a cloud to which the edge device is operatively coupled various communication networks per locations of the edge device, wherein the edge device is mobile;
      predicting a location of the edge device at an estimated time of delivery of an output of a cloud application prior to the estimated time of delivery;
      determining that the location of the edge device from the predicting is serviced by a communication network below a threshold connectivity;
      installing the cloud application on the edge device at a current location according to an access permission on the edge device; and
      facilitating the edge device to generate the output of the cloud application by sending data for the cloud application and a status indicator identifying unprocessed logical functions of the cloud application.

9. The computer program product of claim 8, the predicting comprising:
   building a location prediction model by machine learning based on location history data of the edge device as training data;
   predicting the location of the edge device at the estimated time of delivery of the output by the cloud application by use of the location prediction model; and
   adjusting the predicted location based on any event location scheduled for the user at the estimated time of delivery, based on a calendar of a user.

10. The computer program product of claim 8, the predicting comprising:
    building a location prediction model by machine learning based on location history data of the edge device as training data;
    predicting the location of the edge device at the estimated time of delivery of the output by the cloud application by use of the location prediction model in combination with any event location in a calendar of a user;
    verifying the predicted location based on an actual location of the edge device at the estimated time of delivery; and
    updating the location prediction model with the actual location of the edge device for retraining.

11. The computer program product of claim 8, further comprising:
    subsequent to the analyzing and prior to the installing, determining that the edge device has a capacity to perform the cloud application;
    preparing an edge device installation package of the cloud application, the edge device installation package comprising units of executable files for the edge device corresponding to each of logical functions of the cloud application; and
    automatically transferring the edge device installation package of the cloud application upon determining that a connectivity at the location of the edge device from the predicting is below a threshold connectivity, wherein the access permission to the edge device has been previously granted by a user.

12. The computer program product of claim 8, further comprising:
    subsequent to the analyzing and prior to the installing, determining that the edge device has a capacity to perform the cloud application;
    preparing an edge device installation package of the cloud application, the edge device installation package comprising units of executable files for the edge device corresponding to each of logical functions of the cloud application;
    prompting a user for an input to transfer the edge device installation package of the cloud application to the edge device upon determining that a connectivity at the location of the edge device from the predicting is below a threshold connectivity; and
    transferring the edge device installation package of the cloud application to the edge device upon obtaining the input granting the access permission to the edge device.

13. The computer program product of claim 8, further comprising:
    obtaining, from the edge device, the output of the cloud application from the edge device; and
    updating a cloud app data storage with the output of the cloud application.

14. The computer program product of claim 8, further comprising:
    obtaining, from the edge device, an intermediate result processed by the edge device and the status indicator identifying a remainder of the unprocessed logical functions of the cloud application;

producing the output of the cloud application by processing the remainder of the unprocessed logical functions of the cloud application; and updating a cloud app data storage with the output of the cloud application.

15. A system comprising:

a memory;

one or more processors in communication with the memory; and program instructions executable by the one or more processors via the memory to perform a method comprising:

analyzing resources of an edge device available for computing workloads of a cloud to which the edge device is operatively coupled various communication networks per locations of the edge device, wherein the edge device is mobile;

predicting a location of the edge device at an estimated time of delivery of an output of a cloud application prior to the estimated time of delivery;

determining that the location of the edge device from the predicting is serviced by a communication network below a threshold connectivity;

installing the cloud application on the edge device at a current location according to an access permission on the edge device; and facilitating the edge device to generate the output of the cloud application by sending data for the cloud application and a status indicator identifying unprocessed logical functions of the cloud application.

16. The system of claim 15, the predicting comprising:

building a location prediction model by machine learning based on location history data of the edge device as training data;

predicting the location of the edge device at the estimated time of delivery of the output by the cloud application by use of the location prediction model; and adjusting the predicted location based on any event location scheduled for a user at the estimated time of delivery, based on a calendar of the user.

17. The system of claim 15, the predicting comprising:

building a location prediction model by machine learning based on location history data of the edge device as training data;

predicting the location of the edge device at the estimated time of delivery of the output by the cloud application by use of the location prediction model in combination with any event location in a calendar of a user;

verifying the predicted location based on an actual location of the edge device at the estimated time of delivery; and updating the location prediction model with the actual location of the edge device for retraining.

18. The system of claim 15, further comprising:

subsequent to the analyzing and prior to the installing, determining that the edge device has a capacity to perform the cloud application;

preparing an edge device installation package of the cloud application, the edge device installation package comprising units of executable files for the edge device corresponding to each of logical functions of the cloud application; and automatically transferring the edge device installation package of the cloud application upon determining that a connectivity at the location of the edge device from the predicting is below a threshold connectivity, wherein the access permission to the edge device has been previously granted by a user.

19. The system of claim 15, further comprising:

subsequent to the analyzing and prior to the installing, determining that the edge device has a capacity to perform the cloud application;

preparing an edge device installation package of the cloud application, the edge device installation package comprising units of executable files for the edge device corresponding to each of logical functions of the cloud application;

prompting a user for an input to transfer the edge device installation package of the cloud application to the edge device upon determining that a connectivity at the location of the edge device from the predicting is below a threshold connectivity; and transferring the edge device installation package of the cloud application to the edge device upon obtaining the input granting the access permission to the edge device.

20. The system of claim 15, further comprising:

obtaining, from the edge device, an intermediate result processed by the edge device and the status indicator identifying a remainder of the unprocessed logical functions of the cloud application;

producing the output of the cloud application by processing the remainder of the unprocessed logical functions of the cloud application; and updating a cloud app data storage with the output of the cloud application.

* * * * *